(12) United States Patent
Hong et al.

(10) Patent No.: US 10,666,552 B2
(45) Date of Patent: May 26, 2020

(54) APPARATUS FOR FORWARDING INTEREST IN PARALLEL USING MULTIPATH IN CONTENT-CENTRIC NETWORKING AND METHOD THEREOF

(71) Applicant: UNIVERSITY-INDUSTRY COOPERATION GROUP OF KYUNG HEE UNIVERSITY, Yongin-si, Gyeonggi-do (KR)

(72) Inventors: Choong Seon Hong, Yongin-si (KR); Doo Ho Lee, Anyang-si (KR); Seung Il Moon, Yongin-si (KR)

(73) Assignee: UNIVERISTY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 16 days.

(21) Appl. No.: 16/077,626

(22) PCT Filed: Dec. 13, 2016

(86) PCT No.: PCT/KR2016/014579
§ 371 (c)(1),
(2) Date: Aug. 13, 2018

(87) PCT Pub. No.: WO2017/138693
PCT Pub. Date: Aug. 17, 2017

(65) Prior Publication Data
US 2019/0306053 A1 Oct. 3, 2019

(30) Foreign Application Priority Data
Feb. 12, 2016 (KR) ........................ 10-2016-0016311

(51) Int. Cl.
*H04L 12/26* (2006.01)
*H04L 12/707* (2013.01)
(Continued)

(52) U.S. Cl.
CPC .......... *H04L 45/26* (2013.01); *H04L 43/0864* (2013.01); *H04L 45/24* (2013.01); *H04L 45/745* (2013.01); *H04L 47/283* (2013.01)

(58) Field of Classification Search
CPC ..... H04L 43/0864; H04L 45/24; H04L 45/26; H04L 45/745; H04L 47/283
See application file for complete search history.

(56) References Cited

U.S. PATENT DOCUMENTS 6,947,436 B2 *   9/2005   Harris ................... H04W 28/22
                                                             370/235
7,016,969 B1 *   3/2006   Uzun ...................... H04L 12/42
                                                             709/232
(Continued)

FOREIGN PATENT DOCUMENTS

KR    10-2010-0071688 A    6/2010
KR    10-1012204 B1        2/2011
(Continued)

OTHER PUBLICATIONS

Doo Ho Leeo, et al., "Efficient Parallel Forwarding Strategy in Content Centric Networking", 2015 Winter Conference of Korean Institute of Information Scientists and Engineers (KIISE), 2015, 7 pages.

(Continued)

*Primary Examiner* — Alpus Hsu
(74) *Attorney, Agent, or Firm* — Sughrue Mion, PLLC (57) ABSTRACT

The present invention relates to a technology of forwarding interest parallel by adjusting a ratio of an interest packet requiring content depending upon a network state when a mobile device having a variety of interfaces is connected to various networks in a content-centric networking environment, thereby increasing a data transfer rate. An apparatus for controlling multipath interest forwarding according to an aspect of the present invention includes a weighted forward- (Continued)

ing ratio administrator configured to generate an interest packet; a weighted forwarding ratio storage configured to record and maintain weighted forwarding ratios reflecting a transmission capacity of an interest packet per face; and a forwarding engine configured to control the generated interest packet to be transmitted via each of the faces based on the weighted forwarding ratios.

11 Claims, 5 Drawing Sheets

(51) Int. Cl.
*H04L 12/721* (2013.01)
*H04L 12/741* (2013.01)
*H04L 12/841* (2013.01)

(56) References Cited

U.S. PATENT DOCUMENTS

| | | | | |
|---|---|---|---|---|
| 7,917,648 | B2* | 3/2011 | Wu | H04L 29/06 370/235 |
| 8,300,538 | B2* | 10/2012 | Kim | H04L 45/124 370/238 |
| 8,385,358 | B2* | 2/2013 | Olesinski | H04L 47/623 370/412 |
| 8,547,984 | B2* | 10/2013 | Eberle | H04L 47/623 370/412 |
| 9,160,669 | B2* | 10/2015 | Yin | H04L 47/215 |
| 9,215,623 | B1* | 12/2015 | Oroskar | H04W 36/00 |
| 9,246,821 | B1* | 1/2016 | Li | H04L 47/125 |
| 9,264,353 | B2* | 2/2016 | Krishnaswamy | H04L 47/193 |
| 9,467,384 | B2* | 10/2016 | Zhang | H04L 47/125 |
| 9,485,118 | B1* | 11/2016 | Atlas | H04L 47/10 |
| 9,565,114 | B1* | 2/2017 | Kabbani | H04L 47/125 |
| 9,699,088 | B2* | 7/2017 | Roy | H04L 47/14 |
| 9,992,128 | B2* | 6/2018 | Ho | H04L 43/0829 |
| 9,998,357 | B2* | 6/2018 | Gao | H04L 45/24 |
| 2016/0261507 | A1* | 9/2016 | Kwak | H04L 47/125 |
| 2017/0070427 | A1* | 3/2017 | Zeng | H04L 45/54 |

FOREIGN PATENT DOCUMENTS

| | | |
|---|---|---|
| KR | 10-1465451 B1 | 11/2014 |
| KR | 10-2015-0017999 A | 2/2015 |
| KR | 10-1491918 B1 | 2/2015 |
| KR | 10-2015-0048217 A | 5/2015 |
| KR | 10-2015-0123401 | 11/2015 |

OTHER PUBLICATIONS

International Search Report for PCT/KR2016/014579 dated Mar. 17, 2017 [PCT/ISA/210].

* cited by examiner

APPARATUS FOR FORWARDING INTEREST IN PARALLEL USING MULTIPATH IN CONTENT-CENTRIC NETWORKING AND METHOD THEREOF

CROSS-REFERENCE TO RELATED APPLICATION

This application is a National Stage of International Application No. PCT/KR2016/014579, filed on Dec. 13, 2016, which claims priority to Korean Patent Application No. 10-2016-0016311, filed on Feb. 12, 2016 in the Korean Intellectual Property Office, the disclosure of which is incorporated herein by reference.

TECHNICAL FIELD

The present invention relates to a technical idea of forwarding interest in parallel by adjusting a ratio of an interest packet requiring content depending upon a network state when a mobile device having a variety of interfaces is connected to various networks in a content-centric networking environment, thereby increasing a data transfer rate.

BACKGROUND ART

Content-centric networking is one of the future internet paradigms that address the problems of existing TCP/IP networks. With regard to this, a network structure has been changed from IP-centric communication adopting an end-to-end manner to content name-centric communication adopting a broadcast manner. In addition, a content-centric networking router has the ability to cache chunks of content, whereby, when chunks requested by a client are stored in the content-centric networking router, unnecessary duplication of request packets in the network and overloading of requests to a server can be prevented by transferring the stored chunks.

For example, when a user requests content from Google and receives the content from Google through content-centric networking can be considered. In this case, when User 1 requests content from Google, the request can be transmitted to a Google server via routers H, D, B, and A connected to each other, and the content can be sent to User 1 in a reverse order of the transmitted route, i.e., via A, B, D, and H. In addition, the responsive content can be stored in the routers H, D, B, and A on the route. Subsequently, when another user requests the same content and any one of the routers H, D, B, and A has content requested by router D adjacent thereto, the requested content can be forwarded from any one of the routers H, D, B, and A to the adjacent router D without transmission of the request to the server.

Meanwhile, in existing TCP/IP networking, multipath connections are utilized to provide a highly efficient transmission rate because single-path connections cannot have a transmission rate exceeding a limited bandwidth. Multipath connections can also be utilized in content-centric networking, thereby obtaining efficient transmission and a high transmission rate. There is some research into utilizing multipath connections to receive content at the same time. When there are multiple content providers having the same content, an interest packet can be distributively transmitted to the content providers and content can be simultaneously received therefrom.

To accomplish an operation of distributively transmitting an interest packet, content of which is to be requested, to multiple content providers, content-centric networking routers should have a function of being capable of distributively transmitting an interest packet and a function of being capable of reassembling chunks of content received via different interfaces. In addition, problems can occur in the network because packets are accumulated in an area in which congestion easily occurs when all intermediate content-centric networking routers distributively transmit an interest packet and, accordingly, congestion further easily occurs.

DISCLOSURE

Technical Solution

In accordance with an aspect of the present invention, the above and other objects can be accomplished by the provision of an apparatus for controlling multipath interest forwarding including a weighted forwarding ratio administrator configured to generate an interest packet; a weighted forwarding ratio storage configured to record and maintain weighted forwarding ratios reflecting a transmission capacity of an interest packet per face; and a forwarding engine configured to control the generated interest packet to be transmitted via each of the faces based on the weighted forwarding ratios.

The apparatus for controlling multipath interest forwarding may further include a path storage configured to store a plurality of paths responding that they retain content.

The path storage may determine and record an index per path based on a packet round-trip time.

The weighted forwarding ratio administrator may include a weighted forwarding ratio calculator configured to calculate a transmission capacity of an interest packet per face as a ratio to calculate the weighted forwarding ratios.

The weighted forwarding ratio calculator may reflect a weight according to a packet round-trip time and a weight according to an available bandwidth to calculate a transmission capacity of an interest packet per face as a ratio.

The weighted forwarding ratio calculator may calculate the weight according to the packet round-trip time based on a ratio of an average packet round-trip time of a specific face to the sum of respective average packet round-trip times of a total of faces.

The weighted forwarding ratio calculator may calculate the weight according to the bandwidth based on a ratio of a chunk size to a bandwidth corresponding to the specific face.

The weighted forwarding ratio calculator may update the weighted forwarding ratios using packet round-trip times and available bandwidths in real times.

The weighted forwarding ratio administrator may include a path selector configured to administer a multipath.

The weighted forwarding ratio administrator may include a weighted forwarding ratio aligner configured to align the weighted forwarding ratios in descending order in a queue when the weighted forwarding ratios are updated and thus changed.

In accordance with another aspect of the present invention, there is provided a method of controlling multipath interest forwarding at least temporarily implemented by a computer, the method including a step of recording and maintaining weighted forwarding ratios reflecting a transmission capacity of an interest packet per face; a step of storing a plurality of paths responding that they retain content; a step of generating an interest packet; and a step of performing control such that the generated interest packet is transmitted via a specific path among the plurality of paths through each of the faces based on the weighted forwarding ratios.

The step of storing the plurality of paths may include a step of determining and recording an index per path based on a packet round-trip time.

The method of controlling multipath interest forwarding may further include a step of calculating the weighted forwarding ratios by calculating a transmission capacity of an interest packet per face as a ratio.

The step of calculating the weighted forwarding ratios may include a step of reflecting a weight according to a packet round-trip time and a weight according to an available bandwidth to calculate a transmission capacity of an interest packet per face as a ratio.

The step of calculating the weighted forwarding ratio may further include a step of updating the weighted forwarding ratios using packet round-trip times and available bandwidths; and a step of aligning the updated weighted forwarding ratios in descending order in a queue.

The method of controlling multipath interest forwarding may include a step of calculating a weighted forwarding ratio per face and a step of forwarding a generated interest packet to the face based on the calculated weighted forwarding ratio, wherein the forwarded interest packet is transmitted via a path determined in consideration of a packet round-trip time.

The step of calculating the weighted forwarding ratio per face may include a step of calculating the weighted forwarding ratio based on a state parameter of a network corresponding to each face.

The step of calculating the weighted forwarding ratio per face may include a step of calculating the weighted forwarding ratio based on a packet response time of a network corresponding to each face and an available bandwidth.

BEST MODE

The present invention will now be described more fully with reference to the accompanying drawings, in which exemplary embodiments of the invention are shown. This invention may, however, be embodied in many different forms and should not be construed as limited to the exemplary embodiments set forth herein. Like reference numerals in the drawings denote like elements.

Although terms used in the specification are selected from terms generally used in related technical fields, other terms may be used according to technical development and/or due to change, practices, priorities of technicians, etc. Therefore, it should not be understood that terms used below limit the technical spirit of the present invention, and it should be understood that the terms are exemplified to describe embodiments of the present invention.

Also, some of the terms used herein may be arbitrarily chosen by the present applicant. In this case, these terms are defined in detail below. Accordingly, the specific terms used herein should be understood based on the unique meanings thereof and the whole context of the present invention.

The term "face," described herein refers to an actual interface. For reference, an interface connected to a neighbor is referred to as a "face" in content-centric networking.

Figure 1:
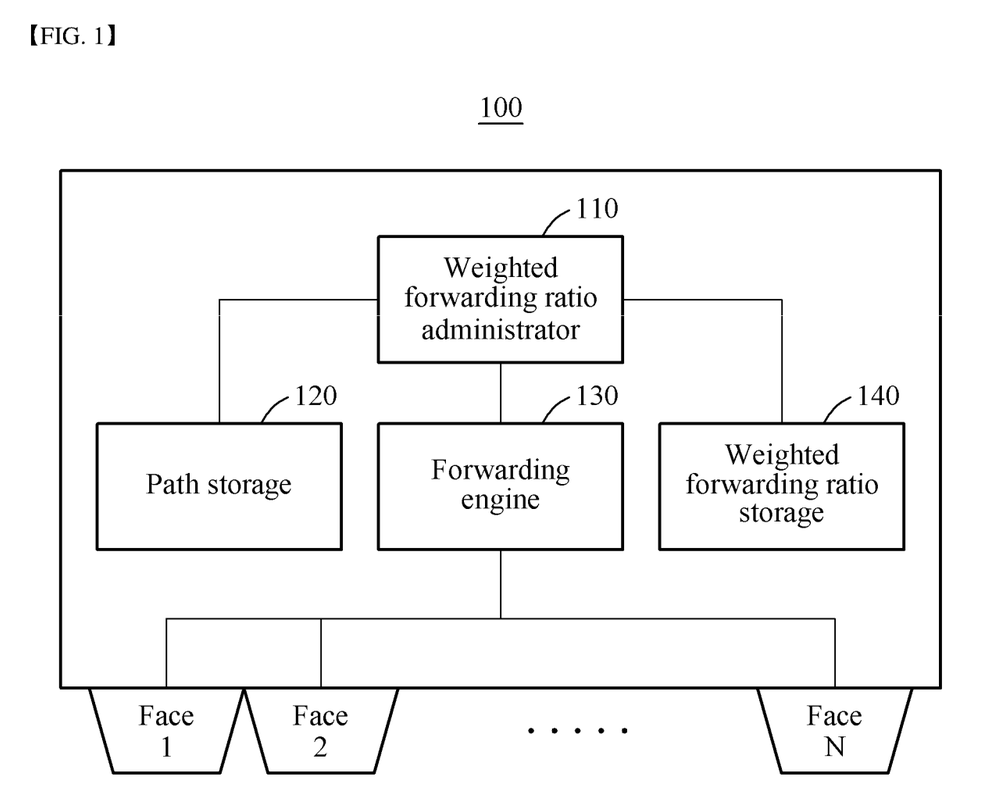
FIG. 1 is a block diagram illustrating an apparatus for controlling multipath interest forwarding according to an embodiment.

FIG. 1 is a block diagram illustrating an apparatus 100 for controlling multipath interest forwarding according to an embodiment.

The apparatus 100 for controlling multipath interest forwarding may include a weighted forwarding ratio administrator 110, a path storage 120, a forwarding engine 130, and a weighted forwarding ratio storage 140. The apparatus 100 for controlling multipath interest forwarding may be implemented at least temporarily by a computing terminal. The computing terminal includes any type of electronic devices such as a personal computer, a medical device, a smart phone, a tablet, and a wearable device. Each of the weighted forwarding ratio administrator 110, the path storage 120, the forwarding engine 130, and the weighted forwarding ratio storage 140 may be physical and/or logical elements included in the electronic devices. For example, the weighted forwarding ratio administrator 110 and the path storage 120 may be implemented by general-purpose computing resources that are controlled by a dedicated hardware or software or an operating system. In addition, the weighted forwarding ratio administrator 110, the path storage 120, the forwarding engine 130, and the weighted forwarding ratio storage 140 may be implemented together in one chip, i.e., might not be physically separated. Implementation of such hardware resources may be changed without specific limitation according to technical development and design changes. Therefore, although the functions, operations, and structures of the weighted forwarding ratio administrator 110, the path storage 120, the forwarding engine 130, and the weighted forwarding ratio storage 140 are understood to be separated from each other, such separation may be differently understood according to embodiments.

In particular, the weighted forwarding ratio administrator 110 generates an interest packet.

Next, the path storage 120 stores a plurality of paths responding that they retain content. For example, the path storage 120 determines and records an index per path based on a packet round-trip time.

Meanwhile, the forwarding engine 130 performs control such that the generated interest packet is transmitted via the respective faces based on a weighted forwarding ratio.

In addition, the weighted forwarding ratio storage 140 records and maintains a weighted forwarding ratio that reflects a transmission capacity of an interest packet per face.

More particularly, the apparatus 100 for controlling multipath interest forwarding divides an interest packet, in a specific ratio, into multiple interfaces and forwards the divided multiple interfaces in consideration of a network state for efficient interest packet forwarding of a mobile device having a variety of interfaces in content-centric networking.

To accomplish this, the path storage 120, which stores multiple paths responding that they retain content, may set an index in consideration of content first received by a use, i.e., a packet round-trip time (RTT). For example, the path storage 120 may set the shortest path as Index 1 and may subsequently set arriving paths as Indexes 2 and 3 according to the arrival order thereof. However, a path may be disconnected while receiving content. Accordingly, a path set as Index 2 may be used as an alternate path for rapid connection recovery when connection fails. To accomplish this, the path storage 120 may record such that an alternate path of a path corresponding to an Nth index is set to a path corresponding to an N+1th index.

The path storage 120 may create as many tables as the total number of interfaces and may allocate one interface to each of the tables. The weighted forwarding ratio storage 140 stores face information and weighted forwarding ratios (WFRs). Face information may represent interfaces to which an interest packet is transmitted. In addition, a weighted forwarding ratio (WFR) represents a ratio in which an interest packet should be transmitted to a corresponding face.

Substantially, data may be stored in a WFR queue of the weighted forwarding ratio storage 140. WFRs in the WFR queue are calculated and updated by a specific formula according to packet round-trip times (RTTs) and available bandwidths in real time. When data of the WFR queue is updated and thus the WFRs are changed, the WFR queue should realign the WFRs in descending order. The WFRs should be continuously realigned in descending order because the forwarding engine 130 confirms a frontmost face number and WFR in a WFR queue and then first transmits the same when the forwarding engine 130 transmits an actual interest packet to each face.

The forwarding engine 130 actually transmits the interest packet, generated in the weighted forwarding ratio administrator 110, to each face. The forwarding engine 130 confirms a face number referring to a WFR queue of the path storage 120 to select interfaces for transmission, and confirms a WFR to determine the quantity of interest packet to be transmitted, upon transmitting the interest packet.

The weighted forwarding ratio administrator 110 is described in detail with reference to FIG. 2.

Figure 2:
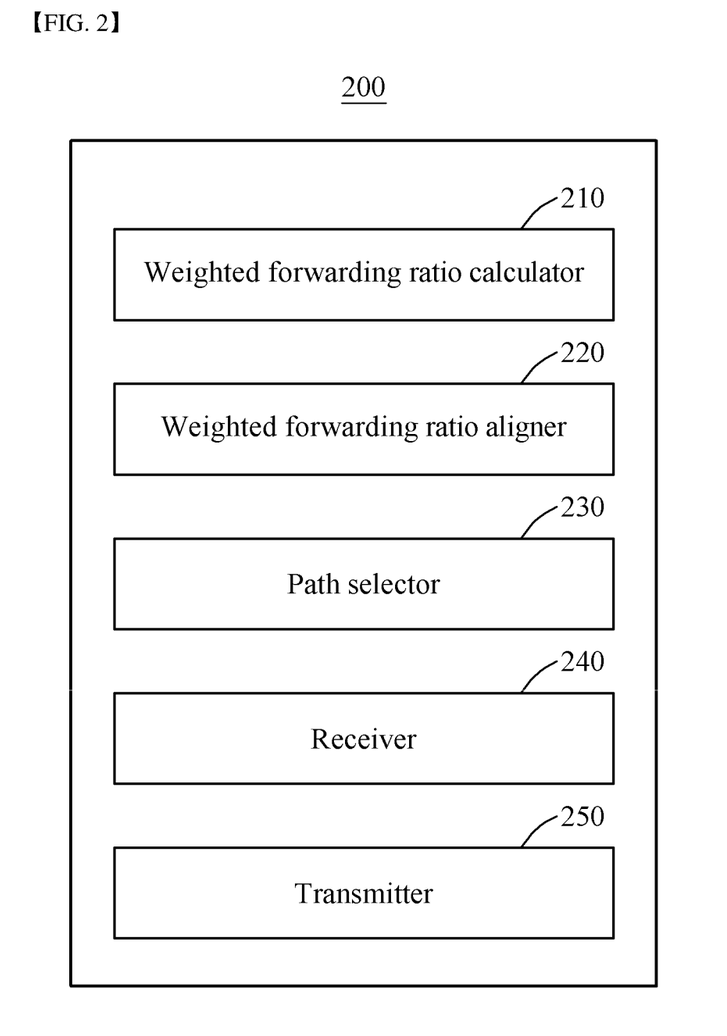
FIG. 2 is a block diagram illustrating a weighted forwarding ratio administrator according to an embodiment.

FIG. 2 is a block diagram illustrating a weighted forwarding ratio administrator 200 according to an embodiment.

The weighted forwarding ratio administrator 200 according to an embodiment may include a weighted forwarding ratio calculator 210, a weighted forwarding ratio aligner 220, and a path selector 230.

The weighted forwarding ratio administrator 200 may further include a receiver 240 and a transmitter 250 for communication.

First, the weighted forwarding ratio calculator 210 calculates a transmission capacity of an interest packet per face as a ratio to calculate the weighted forwarding ratio. For example, the weighted forwarding ratio calculator 210 reflects weights according to a packet round-trip time and weights according to an available bandwidth to calculate a transmission capacity of an interest packet per face as a ratio. In addition, the weighted forwarding ratio calculator 210 may calculate a weight according to the packet round-trip time based on a ratio of an average packet round-trip time of a specific face to the sum of respective average packet round-trip times of a total of faces. Meanwhile, the weighted forwarding ratio calculator 210 may, based on a ratio of a chunk size to a bandwidth corresponding to the specific face, calculate a weight according to the bandwidth.

The weighted forwarding ratio aligner 220 may, when weighted forwarding ratios are updated and thus changed, align the changed weighted forwarding ratios in descending order in a WFR queue.

The path selector 230 may administer a multipath. For example, when, during transmission of an interest packet to a path corresponding to Index 1, the path corresponding to Index 1 fails, the path selector 230 may transmit the interest packet to a path corresponding to Index 2 that is an alternate path of the path corresponding to Index 1.

More particularly, the weighted forwarding ratio calculator 210 may calculate a weighted forwarding ratio, depending upon a network state parameter, to determine the quantity of interest packets to be transmitted to which interface in the terms of efficiency.

First, the weighted forwarding ratio calculator 210 may calculate a weight dependent upon a packet round-trip time (RTT) according to Equation 1 below:

$$\frac{\sum_{j=0}^{k} avg(RTT_j)}{avg(RTT_i)} (i = 1 \ldots k) \qquad \text{[Equation 1]}$$

According to Equation 1, a ratio of an average packet round-trip time ($avg(RTT_j)$) of a specific face to the sum of respective average packet round-trip times ($avg(RTT_j)$) of a total of faces can be found.

Next, the weighted forwarding ratio calculator 210 calculates a weight according to an available bandwidth using Equation 2 below:

$$\frac{Bandwidth_i}{chunksize} (i = 1 \ldots k) \qquad \text{[Equation 2]}$$

That is, Equation 2 may be used to calculate a weight dependent upon a bandwidth based on a ratio of a chunk size to a bandwidth ($Bandwidth_i$) corresponding to a specific face.

The weighted forwarding ratio calculator 210 calculates a weight dependent upon an available bandwidth using Equation 3 below:

$$rawFR_i = \frac{\sum_{j=0}^{k} avg(RTT_j)}{avg(RTT_i)} \times \frac{Bandwidth_i}{chunksize} (i = 1 \ldots k) \qquad \text{[Equation 3]}$$

In Equation 3, a forwarding ratio is calculated by multiplying the weights obtained according to Equations 1 and 2. However, since the forwarding ratio obtained according to [Equation 3] has a very high possibility to include a decimal number, it is difficult to determine the quantity of interest packets to be transmitted using the forwarding ratio. Therefore, it is necessary to represent the forwarding ratio as an integer. The weighted forwarding ratio calculator 210 may calculate a decimal number, obtained according to Equation 3, as an integer using [Equation 4]:

$$WFR_i = \left| \frac{rawFR_i}{\min(rawFR_1, rawFR_2 \ldots rawFR_k)} \right| (i = 1 \ldots k) \qquad \text{[Equation 4]}$$

In Equation 4, a forwarding ratio, to which a weight is applied, is finally calculated by dividing each forwarding ratio by a smallest ratio among forwarding ratios and decreasing a decimal point. Now, a mechanism whereby an actual interest packet is forwarded using the finally calculated forwarding ratio is described as an example. When there are 3 faces, a weighted forwarding ratio of Face 1 thereamong is 10, a weighted forwarding ratio of Face 2 thereamong is 5, and a weighted forwarding ratio of Face 3 thereamong is 1, the forwarding engine first transmits an interest packet requesting from Chunk 1 to Chunk 10 to Face 1, and then transmits an interest packet requesting from Chunk 11 to Chunk 15 to Face 2, followed by transmitting an interest packet requesting Chunk 16 to Face 3. This process is repeated, i.e., the forwarding engine transmits an interest packet requesting from Chunk 17 to Chunk 26 to Face 1, and then transmits an interest packet requesting from Chunk 27 to Chunk 31 to Face 2, followed by transmitting an interest packet requesting Chunk 32 to Face 3. Here, assuming that final weighted forwarding ratios are changed by the equations for finding weighted forwarding ratios, i.e., assuming that the calculated weighted forwarding ratio, 10, of Face 1 is changed to 1, the calculated weighted forwarding ratio, 5, of Face 2 is changed to 2, and the calculated weighted forwarding ratio, 1, of Face 3 is changed to 5, data in a WFR queue is aligned in descending order and, accordingly, a frontmost face in the WFR queue is Face 3, then Face 2, and then Face 1. Accordingly, following the finally requested Chunk 32, the forwarding engine transmits an interest packet requesting from Chunk 33 to Chunk 37 to Face 3, transmits an interest packet requesting from Chunk 38 to Chunk 39 to Face 2, and transmits an interest packet requesting Chunk 40 to Face 1. These processes are repeated until all chunks are received.

Figure 3:
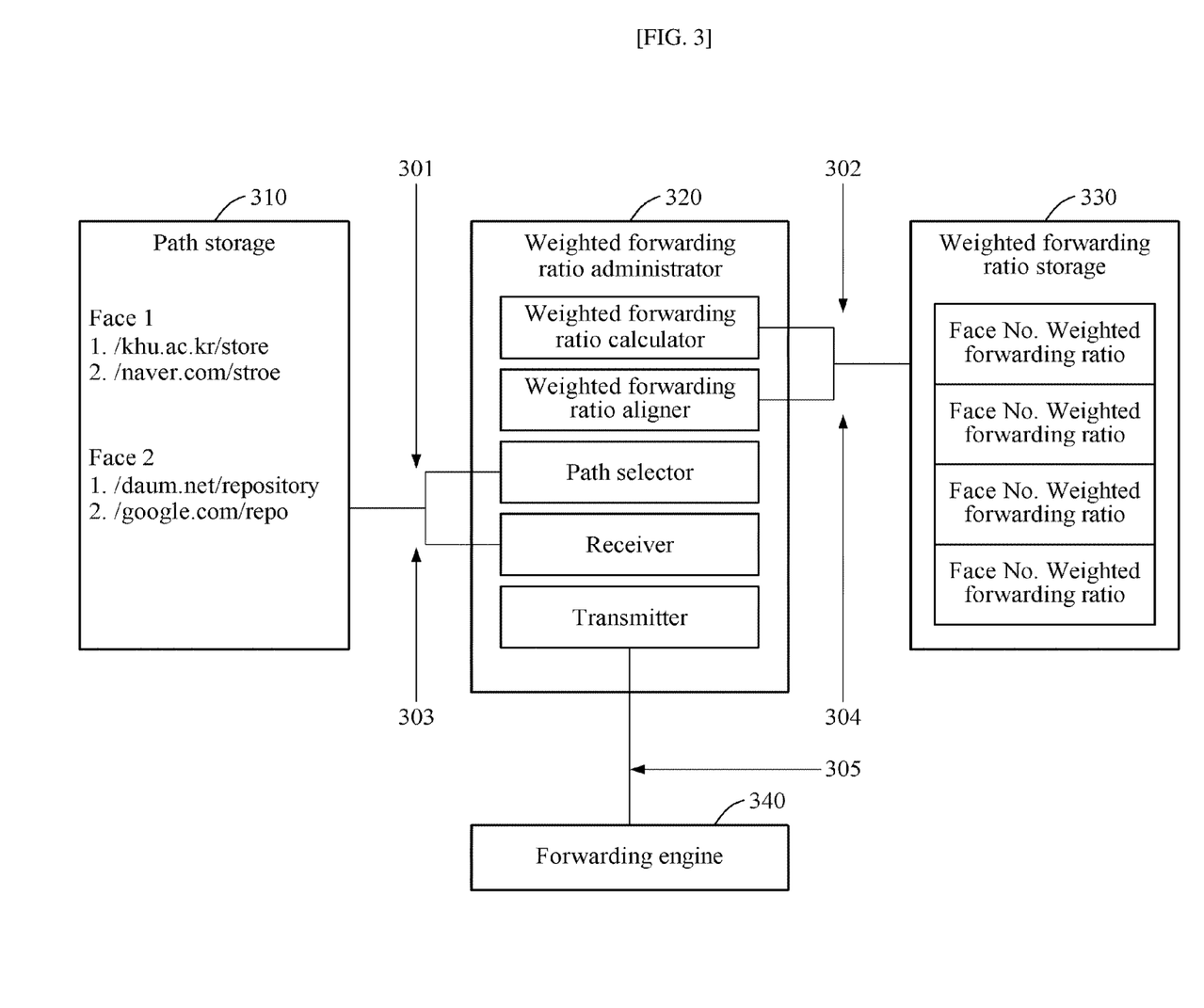
FIG. 3 is a drawing illustrating collaboration between internal components of an apparatus for controlling multipath interest forwarding according to an embodiment.

FIG. 3 is a drawing illustrating collaboration between internal components of an apparatus for controlling multipath interest forwarding according to an embodiment.

The present invention may forward interest in parallel by adjusting a ratio of an interest packet requiring content depending upon a network state when a mobile device having a variety of interfaces is connected to various networks in a content-centric networking environment, thereby increasing a data transfer rate.

To accomplish this, the path storage 310, the weighted forwarding ratio administrator 320, the weighted forwarding ratio storage 330, and the forwarding engine 340 constituting the apparatus for controlling multipath interest forwarding may collaborate as shown in FIG. 3.

For example, the path storage 310 may propose an alternate path to replace a path of Face 1 with a path of Face 2 when the path of Face 1 fails, as shown in reference numeral 301. Accordingly, the weighted forwarding ratio administrator 320 may control such that the path of Face 1 is replaced with the path of Face 2 by selecting an alternate path through a path selector.

As shown in reference numeral 302, all responses may be recorded in a receiver of the weighted forwarding ratio administrator 320.

Meanwhile, as shown in reference numeral 303, a weighted forwarding ratio calculator of the weighted forwarding ratio administrator 320 may calculate a weighted forwarding ratio per face and provide the same to the weighted forwarding ratio storage 330. Accordingly, the weighted forwarding ratio storage 330 may record and maintain a weighted forwarding ratio per provided face. In addition, as shown in reference numeral 304, a weighted forwarding ratio aligner may perform control such that weighted forwarding ratios are aligned in descending order in the weighted forwarding ratio storage 330.

As shown in reference numeral 305, interest packets may be transmitted to the forwarding engine 340. The forwarding engine 340 may transmit interest packets via a specific face in consideration of the number of face in a WFR queue and a weighted forwarding ratio.

Figure 4:
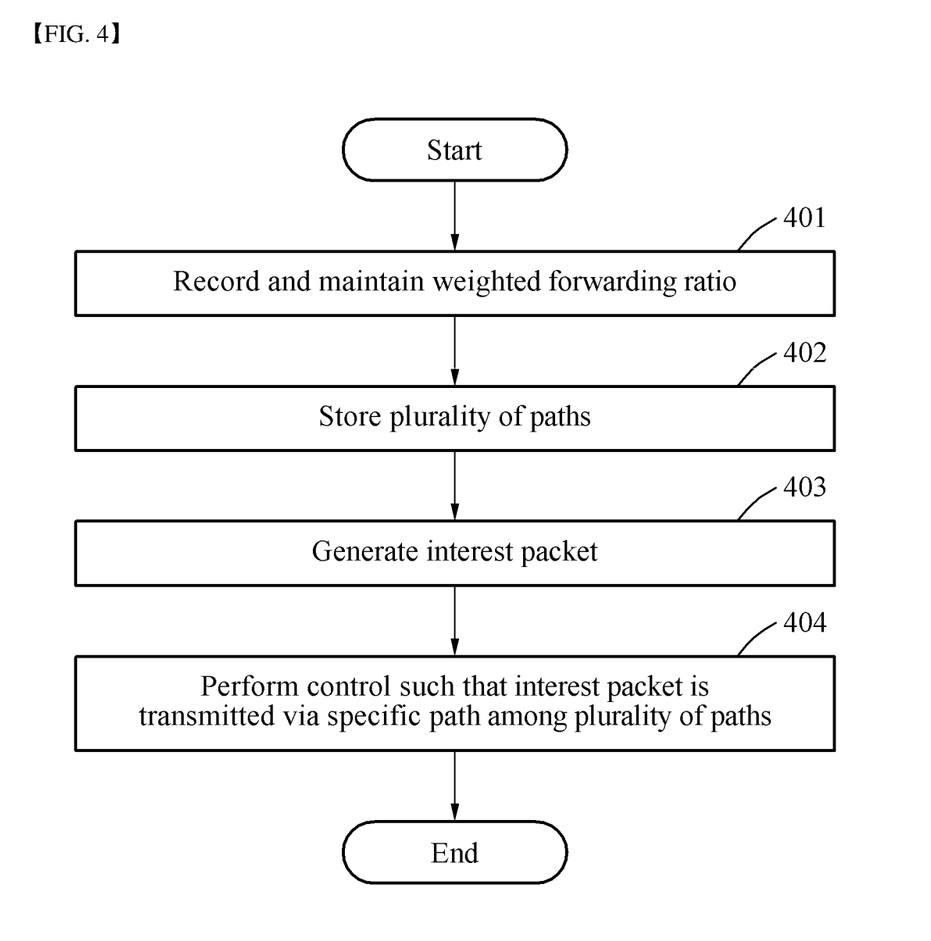
FIG. 4 is a flowchart illustrating a method of controlling multipath interest forwarding according to an embodiment.

FIG. 4 is a flowchart illustrating a method of controlling multipath interest forwarding according to an embodiment.

The method of controlling multipath interest forwarding according to an embodiment includes a step of recording and maintaining weighted forwarding ratios (Step 401). For example, a weighted forwarding ratio reflecting a transmission capacity of an interest packet per face may be recorded and maintained. To accomplish this, the method of controlling multipath interest forwarding may include a step of calculating weighted forwarding ratios.

In particular, the method of controlling multipath interest forwarding includes a step of calculating a transmission capacity of an interest packet per face as a ratio to calculate a weighted forwarding ratio. More particularly, a weight according to a packet round-trip time and a weight according to an available bandwidth may be reflected to calculate a transmission capacity of an interest packet per face as a ratio.

For example, a weight according to a packet round-trip time and a weight according to an available bandwidth may be calculated based on ratio of an average packet round-trip time of a specific face to the sum of respective average packet round-trip times of total faces.

Meanwhile, a weight according to an available bandwidth may be calculated based on a ratio of a chunk size to a bandwidth corresponding to a specific face.

The method of controlling multipath interest forwarding according to an embodiment includes a step of storing a plurality of paths (Step 402). Here, the plurality of paths may be interpreted as paths responding that they retain content.

The method of controlling multipath interest forwarding according to an embodiment includes a step of generating an interest packet (Step 403) and a step of performing control such that the generated interest packet is transmitted via a specific path among stored paths (Step 404). For example, the method of controlling multipath interest forwarding may include a step of performing control such that the generated interest packet is transmitted via a specific path among a plurality of paths through each face based on a weighted forwarding ratio. When the state of a path according to Index 1 is worsened and thus the path fails, the path according to Index 1 may be replaced with a path according to Index 2.

Meanwhile, the method of controlling multipath interest forwarding according to an embodiment may include a step of updating the weighted forwarding ratios using packet round-trip times and available bandwidths and a step of aligning the updated weighted forwarding ratios in descending order in a queue.

Figure 5:
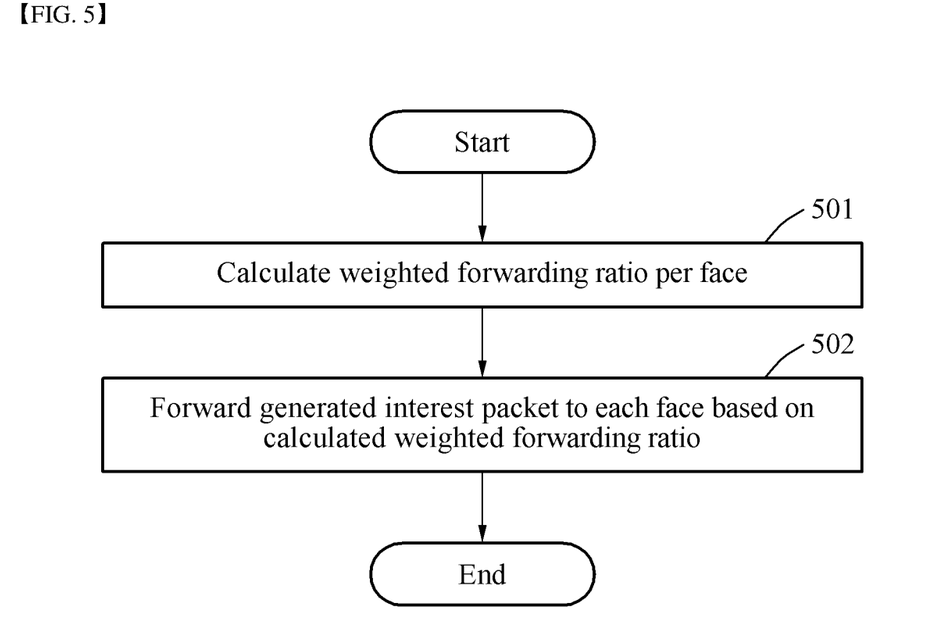
FIG. 5 is a flowchart illustrating a method of controlling multipath interest forwarding according to another embodiment.

FIG. 5 is a flowchart illustrating a method of controlling multipath interest forwarding according to another embodiment.

The method of controlling multipath interest forwarding according to an embodiment may include a step of calculating a weighted forwarding ratio per face (Step 501).

The method of controlling multipath interest forwarding may include a step of calculating the weighted forwarding ratio based on a state parameter of a network corresponding to each face. In particular, a weighted forwarding ratio per face may be calculated based on a packet response time of a network corresponding to each face and an available bandwidth.

In particular, the method of controlling multipath interest forwarding may include a step of calculating a weight according to a packet round-trip time and a weight according to available bandwidth using a ratio of an average packet round-trip time of a specific face to the sum of respective average packet round-trip times of a total of faces. In addition, a weight according to available bandwidth may be calculated based on a ratio of a chunk size to a bandwidth corresponding to the specific face.

In addition, the method of controlling multipath interest forwarding according to an embodiment may include a step of forwarding the generated interest packet per face based on the calculated weighted forwarding ratio (Step 502). In addition, the forwarded interest packet may be transmitted via a path determined in consideration of a packet round-trip time.

As a result, a data transfer rate can be significantly increased by forwarding interest in parallel by adjusting a ratio of an interest packet requiring content depending upon a network state when a mobile device having a variety of interfaces is connected to various networks in a content-centric networking environment according to the present invention.

In addition, high transmission efficiency can be obtained by applying the technique of the present invention to content-centric networking mobile devices supporting various network connections. Further, the present invention can be applied to an end-to-end manner of TCP/IP, not content-centric networking of general mobile devices finding content paths by general broadcast.

For example, the present invention can provide a high transmission rate to real-time video streaming services such as African TV, VOD service, and broadcasting service. That is, the present invention can add a high transmission rate to real-time streaming, thereby allowing seamless transmission of high-quality video.

The aforementioned apparatus may be realized by hardware component, a software component, and/or a combination of hardware and software components. For example, the apparatus and components described in the embodiments may be realized using one or more general-purpose computers or special-purpose computers such as, for example, a processor, a controller, an arithmetic logic unit (ALU), a digital signal processor, a microcomputer, a field programmable array (FPA), a programmable logic unit (PLU), a microprocessor, or other devices implementing instructions and responding thereto. The processor may execute one or software applications that run on an operating system (OS). In addition, the processor may approach data, store, manipulate, and process the data, and generate new data by responding to running of software. Although one processor has been used to aid in understanding, those skilled in the art can understand that the processor may include a plurality of processing elements and/or a plurality of processing element types. For example, the processor may include a plurality of processors or a combination of one processor and controller. Further, another processing configuration, such as a parallel processor, may be applied.

Software may include a computer program, code, instructions, or a combination of one or more of the foregoing, and may configure a processing device to operate as desired or independently or collectively a command to a processing device. Software and/or data may be permanently or temporarily embodied in the form of any type of machines, components, physical devices, virtual equipment, computer storage media or devices, or a signal wave to be transmitted, so as to be interpreted by a processing device or to provide a command or date to a processing device. Software may be distributed over a networked computer system, and stored or executed in a distributed manner. Software and data may be stored on one or more computer readable media.

Embodiments of the present invention can include a computer readable medium including program commands for executing operations implemented through various computers. The computer readable medium can store program commands, data files, data structures or combinations thereof. The program commands recorded in the medium may be specially designed and configured for the present invention or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include a machine language code created by a compiler and a high-level language code executable by a computer using an interpreter and the like. The hardware devices may be configured to operate as one or more software modules to perform operations in the embodiments, and vice versa.

Although exemplary embodiments of the present invention have been disclosed for illustrative purposes, those skilled in the art will appreciate that various modifications, additions and substitutions are possible, without departing from the scope and spirit of the invention as disclosed in the accompanying claims. For example, proper result may be achieved even if the techniques described above are implemented in an order different from that for the disclosed method, and/or disclosed constituents such as a system, structure, device and circuit are coupled to or combined with each other in a form different from that for the disclosed method or replaced by other constituents or equivalents.

It should be understood, however, that there is no intent to limit the invention to the embodiments disclosed, rather, the invention is to cover all modifications, equivalents, and alternatives falling within the spirit and scope of the invention as defined by the claims.

The invention claimed is:

1. An apparatus for controlling interest packet forwarding via a plurality of paths corresponding to interfaces, comprising:
    a weighted forwarding ratio administrator configured to generate an interest packet for requesting content to multiple content providers, wherein the weighted forwarding ratio administrator comprises a weighted forwarding ratio calculator configured to calculate weighted forwarding ratios, each of the weighted forwarding ratios representing a ratio in which the interest packet is transmitted via a corresponding interface of the interfaces;
    a weighted forwarding ratio storage configured to record and maintain the weighted forwarding ratios; and
    a forwarding engine configured to control the generated interest packet to be transmitted via each of the interfaces based on the weighted forwarding ratios,
    wherein the weighted forwarding ratio calculator calculates a weight according to a packet round-trip time corresponding to each of the interfaces and a weight according to an available bandwidth corresponding to each of the interfaces and calculate the weighted forwarding ratios based on the calculated weight according to the packet round-trip time and the calculated weight according to the available bandwidth.

2. The apparatus according to claim 1, further comprising a path storage configured to store the plurality of paths each of which sends a response indicating retention of content.

3. The apparatus according to claim 2, wherein the path storage determines and records an index for each of the plurality of paths based on a packet round-trip time associated with an arrival order of the response.

4. The apparatus according to claim 1, wherein the weighted forwarding ratio calculator calculates the weight according to the packet round-trip time based on a ratio of an average packet round-trip time of a specific interface among the interfaces to a sum of respective average packet round-trip times of a total of the interfaces.

5. The apparatus according to claim 4, wherein the weighted forwarding ratio calculator calculates the weight according to the bandwidth based on a ratio of a chunk size to a bandwidth corresponding to the specific interface.

6. The apparatus according to claim 1, wherein the weighted forwarding ratio calculator updates the weighted forwarding ratios using packet round-trip times and available bandwidths in real times.

7. The apparatus according to claim 1, wherein the weighted forwarding ratio administrator comprises a path selector configured to administer the plurality of paths.

8. The apparatus according to claim 1, wherein the weighted forwarding ratio administrator comprises a weighted forwarding ratio aligner configured to align the weighted forwarding ratios in a descending order in a queue in which data associated with the weighted forwarding ratios is stored when the weighted forwarding ratios are updated and thus changed.

9. A method of controlling interest packet forwarding via a plurality of paths corresponding to interfaces at least temporarily implemented by a computer, the method comprising:

a step of calculating weighted forwarding ratios, each of the weighted forwarding ratios representing a ratio in which an interest packet for requesting content to multiple content providers is transmitted via a corresponding interface of the interfaces;

a step of recording and maintaining the weighted forwarding ratios;

a step of storing the plurality of paths each of which sends a response indicating retention of content;

a step of generating the interest packet; and a step of performing control such that the generated interest packet is transmitted via a specific path among the plurality of paths through each of the interfaces based on the weighted forwarding ratios, wherein the step of calculating the weighted forwarding ratios comprises a step of calculating a weight according to a packet round-trip time corresponding to each of the interfaces and a weight according to an available bandwidth corresponding to each of the interfaces and a step of calculating the weighted forwarding ratios based on the calculated weight according to the packet round-trip time and the calculated weight according to the available bandwidth.

10. The method according to claim 9, wherein the step of storing the plurality of paths comprises a step of determining and recording an index for each of the plurality of paths based on a packet round-trip time associated with an arrival order of the response.

11. The method according to claim 9, wherein the step of calculating the weighted forwarding ratios further comprises:

a step of updating the weighted forwarding ratios using packet round-trip times and available bandwidths; and a step of aligning the updated weighted forwarding ratios in a descending order in a queue in which data associated with the weighted forwarding ratios is stored.

* * * * *